United States Patent [19]
Straub

[11] 4,091,693
[45] May 30, 1978

[54] HELICAL SURFACE-SHAPED MACHINE PART AND METHOD FOR MANUFACTURING THE SAME

[76] Inventor: Immanuel Straub, 7323 Wangs, Switzerland

[21] Appl. No.: 700,060

[22] Filed: Jun. 25, 1976

[30] Foreign Application Priority Data

Jul. 1, 1975 Switzerland............... 8530/75

[51] Int. Cl.² ............................................. B21K 5/02
[52] U.S. Cl. ................................ 76/102; 29/447; 76/2; 175/394; 299/87
[58] Field of Search ............... 76/2, 102; 29/173, 447; 175/394, 395, 323; 299/87; 198/676; 37/81

[56] References Cited

U.S. PATENT DOCUMENTS

| | | | |
|---|---|---|---|
| 901,819 | 10/1908 | Neitzel | 198/676 X |
| 1,939,080 | 12/1933 | Pickard | 198/676 |
| 2,397,305 | 3/1946 | Wheat | 198/676 |
| 2,769,611 | 11/1956 | Schwarzkopf | 29/447 |
| 2,815,192 | 12/1957 | Parrish | 175/394 |
| 3,071,022 | 1/1963 | Strandgren | 29/447 |
| 3,226,855 | 1/1966 | Smith | 175/323 X |
| 3,711,917 | 1/1973 | Baum Gras | 29/173 |
| 3,733,681 | 5/1973 | Schlein | 29/447 |
| 3,937,317 | 2/1976 | Fleury, Jr. | 198/676 |

FOREIGN PATENT DOCUMENTS

| | | | |
|---|---|---|---|
| 135,453 | 7/1960 | U.S.S.R. | 175/323 |

*Primary Examiner*—Ernest R. Purser
*Assistant Examiner*—William F. Pate, III
*Attorney, Agent, or Firm*—Werner W. Kleeman

[57] ABSTRACT

A helical surface-shaped machine part or component having a radially extended flank profile or section. At least two components wound in the same direction are joined together by means of their contacting coils in such a manner that their cross-sections augment one another to form the complete flank profile or section.

7 Claims, 6 Drawing Figures

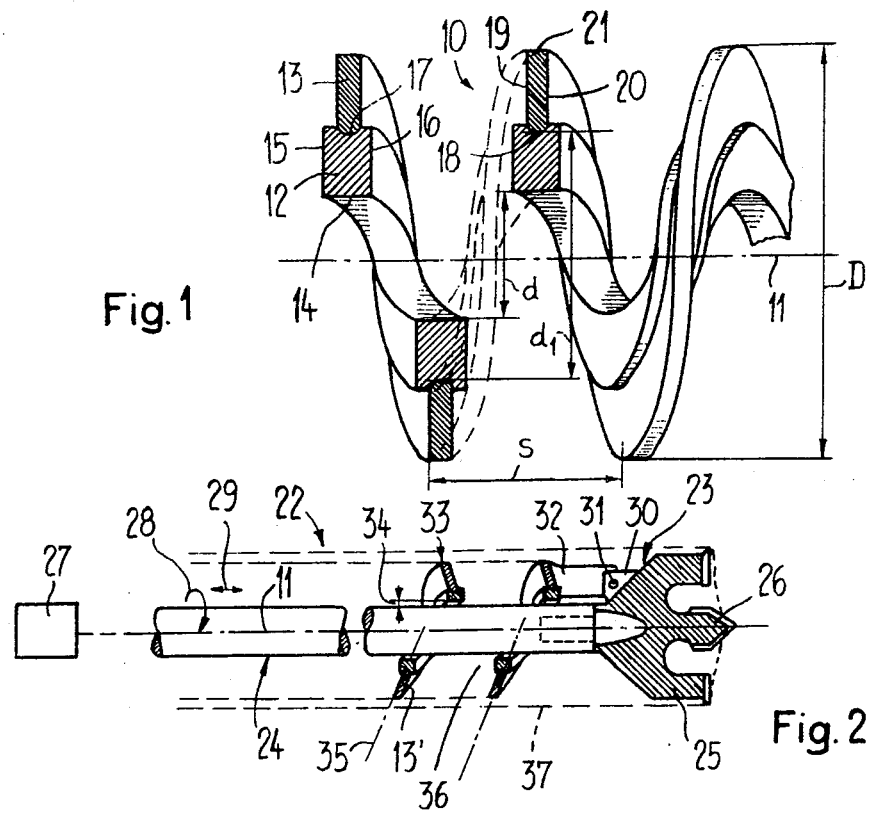
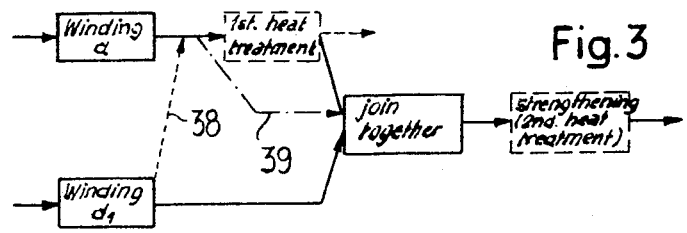
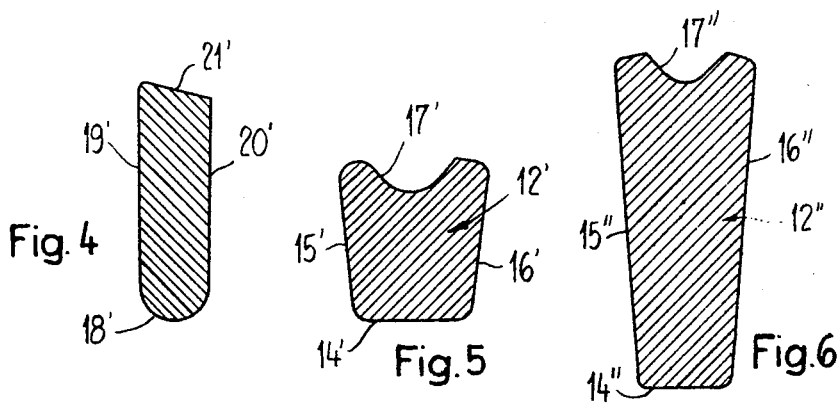

HELICAL SURFACE-SHAPED MACHINE PART AND METHOD FOR MANUFACTURING THE SAME

BACKGROUND OF THE INVENTION

The present invention relates to a new and improved contruction of a helical surface-shaped machine part of the type comprising a flank profile or section extended in radial direction. This invention also relates to a method for manufacturing such machine part, the use of the machine part, and a component for performing the method.

Such machine parts or components are used, for instance, as conveyor elements (for example as Archimedes screws, conveying worms) but also as force transmission elements for the transmission of rotational moments about the axis of the helical surface between two shafts which are misaligned, in other words in the broader sense are used as helical springs which can be subjected to bending loads. A further application is for instance as coiled cooling fins at a pipe or tube, but this field of use is of lesser importance in the present situation since coiled or helical-shaped cooling fins are seldom subjected to considerable mechanical loads during operation.

Apart from the possibility of previously forging or casting and the subsequent machining from the complete part, a technique especially practiced with conveyor worms, there are two possibilities of producing such machine parts or components.

The first of these possibilities resides in winding a rod having a cross-section corresponding approximately to the flank profile or section while in an upright position thru a predetermined diameter, for instance about a winding mandrel. With this manufacturing technique the degree of the lengthwise extent of the rod section is extremely limited by the winding radius. In other words, it was not heretofore possible with the upright winding of a rod to produce such a machine part or component wherein the height of the flank section considerably exceeded the size of the winding radius. Of course, the permissible winding radii vary from material to material and also are dependent upon the cross-sectional shape of the starting profile. Since, however, as a general rule with such machine components it is especially the peripheral regions of the helical surface or the regions which are remote from the axis thereof which are exposed to mechanical load (for instance wear or bending about the section root) the material selection equally is governed by such criteria. Consequently, in particular flowable, i.e., easily cold workable material, which otherwise would allow for higher flank sections, cannot be used for these reasons.

The other mentioned possibility for manufacturing such machine components resides in initially preparing circular rings with a ring cross-section corresponding to the predetermined flank profile or section, then cutting open these circular rings for instance along a radius and deforming the same into a helical surface, whereafter a number of circular rings are connected in succession into the machine component with the cut locations abutting one another. While it is thereby possible to produce sections of practically random height, nonetheless not only is the manufacture thereof extremely cumbersome and difficult, but the finished product also is associated with drawbacks attributable to the manufacturing technique. Such drawbacks, in many instances, render completely unusable such type manufactured machine component. For instance, with this prior art technique it is practically not possible, during the manufacturing process, to maintain an exact size of the pitch and/or to prevent irregular mechanical properties attributable to the connection locations.

SUMMARY OF THE INVENTION

Hence, it is a primary object of the present invention to oversome the aforementioned drawbacks and limitations of the prior art as discussed above.

Another and more specific object of this invention aims at providing a machine component or part of the previously mentioned type which affords the manufacturing advantages which can be attained by a winding operation, without having to accept an appreciable restriction in the selection of the processed material and/or the height of the flank section or profile.

A further object of the present invention aims at the provision of a novel method of manufacturing the aforementioned machine components or parts.

Now in order to implement these and still further objects of the invention, which will become more readily apparent as the description proceeds, the machine part or component proposed according to the invention is manifested by the features that at least two components wound in the same direction are joined together with the coils contacting one another in such a manner that their cross-sections complement one another to form the complete flank section.

Thus to a certain extent the invention is concerned with a so-to-speak "composite helix," the components of which can be formed of different materials in accordance with their winding radius and the cross-sections of which augment one another to form the entire flank section.

In order to fabricate the proposed machine part there is contemplated a method which, according to the invention, is manifested by the features that the one component is helically wound about a first diameter, the other component is wound about a diameter corresponding approximately to the diameter of the envelope or jacket surface of the first wound component and with the same pitch, and that the one wound component is inserted into the other wound component.

The inventive machine part can be used according to the invention as a conveyor helix or screw.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a fragmentary side view, partially in section, of a first examplary embodiment of machine component or part constructed according to the invention;

FIG. 2 illustrates a second embodiment employed as a conveyor helix at a rock borer or drill;

FIG. 3 is a flow diagram of an embodiment of the method for producing for instance the helix of FIG. 1 or that of FIG. 2;

FIGS. 4, 5 and 6 are respective cross-sectional profiles or sections of rods, from which there can be fabricated the components of helixes, similar to the conveyor helix of FIG. 2.

DETAILED DESCRIPTION OF THE INVENTION

Describing now the drawings, the machine component or part 10 illustrated by way of example in FIG. 1 will be seen to possess the shape of a helical surface having an inner diameter $d$, an outer diameter D and a pitch $s$. The axis of the helical surface is designated by reference character 11. The flank section or profile of the component 10 is extended in radial direction and possesses approximately the shape of the letter "T," wherein the beam of such T is formed by a first component 12 and the column of the T by a second component 13. Both components 12 and 13 possess a cross-section which is extended in radial direction and the cross-sections of the components augment one another to form the total or entire cross section.

In particular the one component 12 possesses an approximately rectangular cross-section, the one shorter side 14 of which bears upon the jacket of a cylindrical surface having the diameter $d$, whereas both of the longer sides 15, 16 are located in planes extending at right angles to the axis 11. At the other shorter side of the cross-section of the component 12 there is formed an arc-shaped, radially outwardly open groove 17. The second component 13 likewise possesses an approximately rectangular cross-section, wherein however the shorter side 18 confronting the axis 11 is arc-shaped and snugly sits in the groove or channel 17. The longer sides 19, 20 of the cross-section of the second component 13, with the embodiment under discussion, likewise are disposed in planes extending at right angles to the axis 11, and the shorter side 21 of such cross-section remote from the axis is located at a cylindrical surface having the diameter D.

The first component 12 therefore forms the root of the flank section or profile of the part or component 10 and — as will be indicated more fully hereinafter — can be wound from a comparatively easily cold workable material, whereas the second component 13 forms the peripheral part of the flank section which is generally also exposed to greater mechanical loads. The groove 17 in the first component 12 forms so-to-speak a bolt thread, whereas the shorter side 18 of the second component 13 forms a nut thread which fits therewith, so that both threads can be threadably interconnected with one another. In other words, the connection between both of the components 12, 13 is form-locking in the axial direction and is force-locking in the rotational direction related to the axis 11.

As will be explained hereinafter it is not absolutely necessary that there be provided a form-locking connection in the axial direction between both of the components 12 and 13. It is equally possible to only provide a sufficient force-locking connection which from strength considerations satisfies the requirements.

Equally it is not absolutely necessary to select the width of the cross-section of the first component 12 (shorter side 14) greater than that of the second component 13 (shorter side 21). Also there is not absolutely necessary the arcuate-shape for the groove 17 and the shorter side 18 for a form-locking connection in the axial direction. Yet, the arcuate-shape of the groove 17 affords certain advantages since this shape is also compatible with second components, the cross-section of which with respect to the axis 11 is oriented different than that illustrated in FIG. 1, without there having to be undertaken some change at the first component.

By referring to FIG. 2 there will be recognized a rock drill or borer 22 having a cutter vane 25 equipped with a number of tungsten carbide cutters and a borer head 23 having a centering tip 26. The borer head 23 can be formed of one-piece, or, as illustrated, exchangeably secured at one end of a shaft 24. The other end of the shaft 24 is coupled to a drive unit 27 which has only been schematically illustrated and imparts to the rock drill 22 a rotational movement in the direction of the arrow 28 and, if desired, also an impact movement in the direction of the double-headed arrow 29. At the drill or borer head 23 there is secured, for instance by means of a bracket 30 formed thereat and a pin 31, the flexed or bent-out end 32 of a conveyor helix or screw 33 which in principal is constructed like the component 10 of FIG. 1. The conveyor helix 33 surrounds the shaft 24 with play, as indicated in FIG. 2 by the dimensional arrow 34, and it is only attached at the drill head 23 or only rigidly connected for rotation therewith.

The most important difference between the conveyor helix or screw 33 and the component or part 10 of FIG. 1 resides in the fact that the lengthwise extent of the (likewise essentially rectangular) cross-section of its peripheral component 13' is not directed at right angles to the axis 11, rather forms together therewith an acute although almost right angle, as generally indicated by the broken line 35.

If during its use the rock drill 22 is driven, then there is entrainably rotated the conveyor helix 33, yet however receives its drive power from the drill head 23. By virtue of the foregoing and also the play 34 between the shaft 24 and the inner diameter of the conveyor helix 33 a certain freedom is present for the latter as well as also for the shaft 24, which can elastically bend or twist independently of one another. At the same time the conveyor helix 33 together with the shaft 24 forms a helical-shaped conveying trough for the borings or excavated material produced by the drill head 23. This material, due to the orientation of the component 13' with respect to the shaft 24, has the tendency at the region of the shaft 24 of being conveyed out of the borehole 37. This is particularly of advantage for downwardly driven boreholes. The fact that the radial extent of the flank section or profile of the conveyor helix can practically be randomly selected owing to the aforedescribed construction, renders it possible to design the diameter of the shaft 24 only with respect to the rotational moment to be transmitted to the drill or boring head 23, so that it can bend without danger somewhat in the manner of a flexible shaft. Moreover, at the same time the outer diameter of the conveyor helix 33 almost spans over the inner diameter of the formed borehole 37 and additionally the peripheral region of such conveyor helix 33, namely the component 13' especially subjected to wear, can be formed of a steel which is particularly able to withstand such load.

As an exemplary manner of fabricating the component or part 10 of FIG. 1 or the conveyor helix 33 of FIG. 2 there now will be made reference to FIG. 3. In a first step the component 12 is wound about a diameter corresponding to the dimension $d$ with a certain pitch, for instance as such is known from the fabrication of helical springs. To this end there is used a profile or section rod formed of a ductile material, permitting coiling through the diameter $d$, without there being formed any fissures or cracks. The thus formed, coiled first component can be subjected to a first thermal treatment in order to relieve internal stresses which have been formed during the winding or coiling operation. This first thermal treatment possibly results in shrinkage of the material, so that the original winding diameter has been somewhat reduced, or, if the thermal treatment is carried out with the wound material upon a mandrel, the number of coils reduced somewhat.

In a second step or operation the second component is wound in a right-angle or inclined upright position through a diameter corresponding to approximately $d_1$ (see FIG. 1) and with the same pitch. Since the diameter $d_1$ in any case is greater than the diameter $d$ by about twice the radial extent of the section or profile of the first component, there can be used for instance a less ductile material for the second component which then possesses a greater mechanical strength. The winding of the second component likewise advantageously is carried out upon a mandrel. However, it is also possible to carry out the second winding step — as indicated with the broken line 38 in FIG. 3 — directly upon the first wound component provided that such is suitably supported during the second winding operation in order to avoid deformation.

Then the first and second wound components are joined together so that their coils overlie one another. This assembly occurs, as already indicated, advantageously by threading into one another both of the components. This threadable interconnection is then particularly easy if both impact surfaces of the components form a form-locking connection in the axial direction. The frictional forces which result during the threading operation additionally have the advantageous tendency of elastically twisting the inner component in the winding sense and the outer component opposite to the winding sense. Consequently, the outer diameter of the inner component is briefly reduced and the inner diameter of the outer component briefly enlarged, thereby facilitating the threadable interconnection.

After the assembly there can be carried out a second heat or thermal treatment. Hence, the first component which already was subjected to a first such treatment, will no longer or only at most negligibly shrink, whereas the second, still untreated component will be shrunk onto the first component, producing a practically non-releasable connection between the components.

By appropriately selecting the materials with respect to their shrinkage properties for the first and the second components it is possible, if desired, to dispense with the first thermal treatment, as indicated in FIG. 3 by the broken line 39. This is particularly then the case when the shrinkage properties of the material of the second component are more pronounced than those of the first component.

Due to the second thermal treatment there is simulataneously relieved the internal stresses formed during the cold working during winding.

In FIG. 4 there is illustrated an example of a starting section or profile for the second component 13' of the conveyor helix 33. The cross-section of this profile possesses two longer parallel sides 19' and 20', an approximately semicircular side 18' as well as an inclined side 21'. This profile or section is intended to be wound about a winding axis which is approximately parallel to the inclined side 21', i.e., in a position where the longer sides 19' and 20' are inclined to the winding axis. The end effect of all of this is that the shorter side 21', after winding, comes to lie at a cylindrical surface which is coaxial to the winding axis.

FIGS. 5 and 6 illustrate respective examples for the starting section or profile 12' and 12" for the first component 12. What is especially to be noticed in this instance is that the longer sides 15', 16' (FIG. 5) and 15", 16" (FIG. 6) do not extend parallel to one another like the sides 15, 16 of the component 10 of FIG. 1, rather diverge from the related side 14' and 14" respectively. During winding the shorter side 14' or 14", as the case may be serves to bear against the winding mandrel. Consequently, during the winding operation there is formed a radially outwardly increasing extent of the profile in a direction at right angles to the plane of the drawing and along therewith a radially outwardly increasing constriction of the profile cross-section, so that after the winding the longer sides 15', 16' (FIG. 5) and 15", 16" (FIG. 6) extend approximately parallel to one another. At the same time the related groove 17' (FIG. 5) and 17" (FIG. 6) in the starting profile or section deforms approximately into an arc or arcuate configuration.

Although the described machine parts or components consist of two components it should be understood that there also can be formed parts having more than two components without there arising any appreciable difficulties. Due to its composite-like structure the described machine part or component additionally possesses exceptional mechanical strength and by virtue of its manufacture high dimensional accuracy. Therefore it is, for instance, also readily possible to tighten the machine part upon a cylindrical shaft (for instance by first twisting opposite to the winding sense) and to employ the thus formed structure as a conveying worm.

While there are shown and described present preferred embodiments of the invention, it is to be distinctly understood that the invention is not limited thereto, but may be otherwise variously embodied and practiced within the scope of the following claims. Accordingly,

What is claimed is:

1. A method of manufacturing a machine part unsupported by a core and having a flank section extended in radial direction, comprising the steps of: winding and thereby cold working a first metallic component formed of one piece in a substantially helical-configuration through a first diameter into a plurality of coils, winding and thereby cold working a second metallic component formed of one piece through a diameter approximately corresponding to the diameter of the jacket surface of the first wound component and with the same pitch and into a plurality of coils, and introducing the first wound metallic component into the second wound metallic component.

2. The method as defined in claim 1, including the step of carrying out a helical-like movement in order to introduce both of the helical-shape components into one another.

3. The method as defined in claim 1, including the step of fastening to one another the components introduced into one another.

4. The method as defined in claim 3, including the steps of shrink fitting the second component upon the first component.

5. The method as defined in claim 1, including the step of winding the second component upon the first component.

6. The method as defined in claim 1, including the step of using as one of the components a component having a cross-section which becomes wider with increasing spacing from the winding axis.

7. A method of manufacturing a machine part having a flank section extended in radial direction, comprising the steps of: winding a first component in a substantially helical-configuration through a first diameter, winding a second component through a diameter approximately corresponding to the diameter of the jacket surface of the first wound component and with the same pitch, subjecting the first component after the winding thereof to thermal treatment and thereafter introducing such first component into the second component to form a component assembly, then subjecting said component assembly to a further thermal treatment in order to shrink the second component onto the first component in order to fasten the components to one another.

* * * * *